Patented Dec. 12, 1933

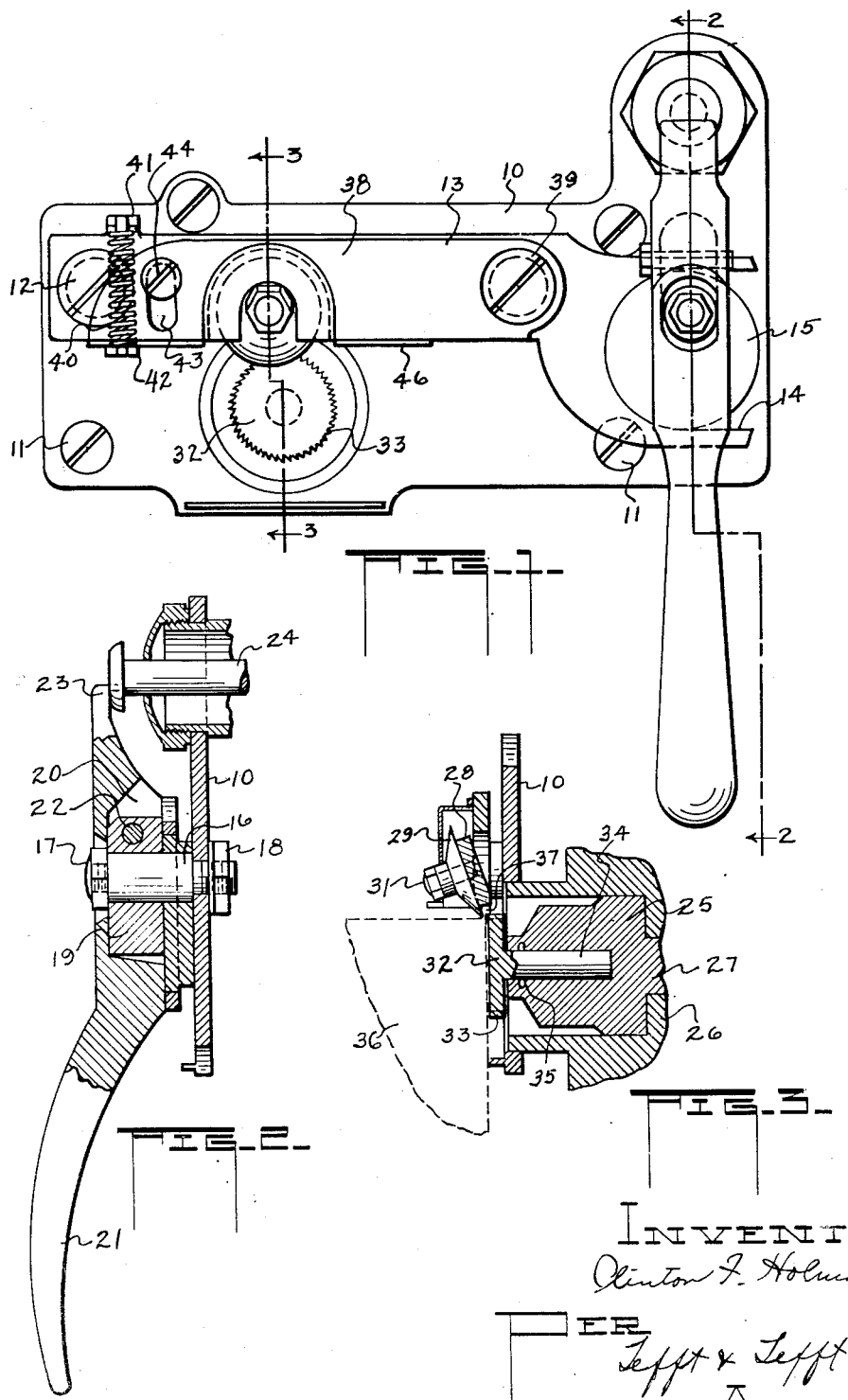

1,939,349

UNITED STATES PATENT OFFICE 1,939,349

CAN OPENING DEVICE

Clinton F. Holman, Pontiac, Ill.

Application April 4, 1931. Serial No. 527,631

2 Claims. (Cl. 30—3)

This invention relates to can opening devices.

One of the objects of the invention lies in the provision of a can opening mechanism which includes a power driven drag wheel, a cutter bar disposed in an operative position with respect thereto, and manually operated means capable of movement in one direction to control the movements of the cutter bar with respect to the drag wheel, while movement of said control member in another direction controls the operation of a power means accomplishing the rotation of the drag wheel.

Another object lies in the provision of a can opening mechanism comprising a cutter arm and drag wheel, there being also provided lever mechanism acting in one instance to operatively relate the drag wheel and cutter arm and in another instance to control the movement of power mechanism which in turn acts to rotate the drag wheel, said mechanism also including a means for supporting the can when the top of same has been removed.

Other objects will appear in the following specification, taken in connection with the annexed drawing, in which—

Fig. 1 is a front elevational view of my can opening mechanism;

Fig. 2 is a cross-sectional view taken on the line 2—2 of Fig. 1;

Fig. 3 is a cross-sectional view, taken on the line 3—3 of Fig. 1.

Before referring specifically to the drawing, it might be stated that the present can opening device departs materially from the conventional group comprising such mechanisms in that same is adapted to be used either as a part of or as a unit in connection with the ordinary kitchen equipment. In other words, the device may be connected to the power mechanism either electrically driven or water-power driven, which is ordinarily used in connection with other mechanical kitchen equipment. As will be later pointed out, applicant's device is adapted to overcome the necessity, which is present in all can opening mechanism, of manual exertion in removing the top of the can.

In the drawing, a plate 10 is secured by means of the plural fastening means 11 to some portion of a recognized kitchen equipment. For instance, same may be disposed adjacent the kitchen sink, the fastening means 11 holding the frame 10 against the face of the sink, said framing forming a portion of, we will say, a tile wall surface.

In any event, the device is adapted to be disposed in a convenient manner in the kitchen, as well as in a position to afford the highest degree of efficiency as respects the can opening operation.

Upon the plate 10 is pivoted at one end, as at 12, a frame 13, which extends entirely across the plate 10, its opposite end being bifurcated in the manner shown at 14 to receive an eccentrically mounted cam portion 15. This cam 15 is pivoted about a lug 16 having a head 17 and nut 18. The eccentric has an upwardly projecting rectangularly shaped portion 19 integrally formed therewith, said portion 19 being disposed within a cutout portion 20 of a manually operable lever 21. The lever 21 is pivotally connected, as at 22, to portion 19 of the eccentric 15. Pivotal movement of member 21 with respect to the eccentric is permitted, due to the fact that said member is apertured to receive the previously mentioned projecting head 17 of the lug 16, upon which the eccentric is pivoted.

The upper end 23 of the manual control lever is adapted to engage a plunger clutch or switch 24, as the case may be, which in turn is connected to a power driven means, only a portion of which has been shown in Fig. 3 of the drawing. This plunger or switch is adapted to control the movement of an electric motor or water motor, as desired, a driving portion of which power driven mechanism has been described as 25 in Fig. 3. This power driven member 25 is adapted to be housed in a framing portion 26, said member 25 having a connecting shaft 27 with the power driven unit. Inasmuch as either an electric or water motor is sufficiently conventional in the art to obviate detail description thereof, the drawing has been confined merely to the novel portions of applicant's device, although it is obviously contemplated that same is adapted to be used in operative combination with such mechanism.

It is quite apparent that movement of the manual control lever 21 in one direction operates the eccentric to elevate the frame 13 upon its pivot 12, and further that movement of said member in the opposite direction is calculated to lower said portion. It is further obvious that a withdrawal movement of the lever 21 will operate to move the switch or plunger 24, which in turn operates an electric or water motor, as the case may be, the driving portion 25 of which is in turn moved. It is obvious that gear mechanism of some nature would need to be used in order to reduce the speed of the ordinary motor to the desired speed of rotation for the member 25.

The frame 13 has a portion 28 thereof struck slightly outwardly in a manner to permit a slight angular disposition of a cutter arm 29 thereon. This cutter arm is pivotally related to the portion 28 by means of the pivot 30 and securing mechanism 31. This cutter bar arm is free to pivot upon the member 30.

A drag wheel 32, having the conventional ratchet teeth 33 thereon, is disposed in an operative position with respect to the cutter bar, the inwardly projecting shaft 34 thereof being pinned, as at 35, to the previously mentioned driven member 27.

Now, with respect to the normal operation of applicant's can opening device, as herein described, it is apparent that the operator by movement of the handle 21 may elevate the frame 13, permitting a can, as shown at 36, to have its upraised portion 37 disposed in an operative position with respect to the drag wheel 32. The can is maintained in this position manually, and the lever 21 is moved to a position wherein the frame is lowered and consequently the edge of the cutter bar 29 is forced against the inner side of the upraised edge 37 of the can. The operator now withdraws the handle 21 outwardly upon its pivot 22, with the result that the switch or plunger 24 is moved in a manner to operate either an electric or water motor, with a consequent rotation of the driven member 25. Obviously, such rotational movement is transmitted to the drag wheel, which in turn moves the can with respect to the cutter bar, with the result that the top of the can is gradually removed.

Means for supporting the can upon the final cutting operation is through a shoulder or supporting member 38, pivoted as at 39 on the frame 13. The opposite end of the supporting member is carried in a tensioned manner by means of the coil spring 40, which is disposed between the lug 41 on the frame 13 and a second lug 42 on portion 38. Said member 38 is slotted as at 43 to permit movement of same with respect to a guide key or lug 44. This supporting member 38, which also acts as a housing for the cutter bar, is positioned in this tensioned manner in order to create, by means of its edge portion 46, a pressing action on the top of the can when the final cutting action is completed. In other words, the can is manually placed in operative position with respect to the drag wheel and cutter bar, the top of the can is removed and still the can is maintained in this supported position by means of the peculiar fashioning of the member 38.

The operation of applicant's can opening device is thought to have been sufficiently described in the foregoing specification, to obviate further necessity of explaining same.

What I claim is:

1. A can opening device including in combination a power driven drag wheel, a cutter wheel, a pivoted frame carrying said cutter wheel, an eccentric controlling the movement of said frame, a manual control lever connected to said eccentric in a manner to control the movement of the frame, power means for rotating the drag wheel, a pivotal mounting for the manual control means, and mechanism controlled by the movement of the manual control means upon its pivot to control the rotational movement of the drag wheel.

2. A can opening device including in combination a power driven drag wheel, a pivoted frame member, a cutter wheel disposed thereon capable of operative movement towards and from said drag wheel, an eccentric, manual control means for moving said frame to accomplish the operative relationship of the cutter wheel with the drag wheel, a pivotal mounting for the manual control member, mechanism operated by movement of the manual control member upon its pivot for controlling the rotational movement of the drag wheel, and a member mounted upon the frame in a tensioned manner for supporting the can when the cover of same has been removed.

CLINTON F. HOLMAN.